United States Patent [19]
Burns et al.

[11] Patent Number: 5,701,178
[45] Date of Patent: Dec. 23, 1997

[54] NON-DAMAGING FLATNESS AND THICKNESS GAUGE FOR GLASS

[75] Inventors: James F. Burns, Lindley; Michael J. Dailey, Painted Post; Scott W. Deming, Elmira, all of N.Y.

[73] Assignee: Corning Incorporated, Corning, N.Y.

[21] Appl. No.: 270,753

[22] Filed: Jul. 5, 1994

[51] Int. Cl.⁶ .......................... G01B 11/06; G01B 11/30
[52] U.S. Cl. .................... 356/371; 356/382; 356/394
[58] Field of Search .............................. 356/371, 381, 356/382, 239, 73, 394

[56] References Cited

U.S. PATENT DOCUMENTS

| | | | |
|---|---|---|---|
| 3,940,608 | 2/1976 | Kissinger et al. | 250/227 |
| 4,597,785 | 7/1986 | Karbassiyoon et al. | 65/2 |
| 4,672,200 | 6/1987 | Claypool et al. | 356/382 |
| 4,853,018 | 8/1989 | Koss et al. | 65/94 |

FOREIGN PATENT DOCUMENTS

| | | | |
|---|---|---|---|
| 63-71609 | 4/1988 | Japan | 356/371 |

OTHER PUBLICATIONS

Fiber Optic Lever Displacement Sensors and Automated Reflectance Compensation Improvements, by C. Kissinger, FOC/LAN 83, pp. 300–304.

Displacement Measurement by Fiber Optics by Curtis Kissinger, Apr. 1988, Measurement and Control.

Improved Noncontacted Fiber Optics/Lens Displacement Measuring System by Curtis Kissinger and Richard Smith, 1973.

*Primary Examiner*—F. L. Evans
*Attorney, Agent, or Firm*—Robert L. Carlson

[57] ABSTRACT

A gauging system is provided for measuring glass flatness and thickness, in which a glass sheet is accurately supported on a reference plane, and fiber optic sensors are lowered toward the glass to sense the location of the upper and lower surfaces of the glass sheet. The sensors send signals, which are representative of the locations of the surfaces, to a central processing unit which is used to calculate thickness and/or flatness of the glass sheet.

15 Claims, 3 Drawing Sheets

NON-DAMAGING FLATNESS AND THICKNESS GAUGE FOR GLASS

FIELD OF THE INVENTION

The present invention relates to a method and apparatus for measuring the flatness and thickness of glass, particularly glass which is to be used to manufacture liquid crystal display devices.

BACKGROUND OF THE INVENTION

Glass sheets are typically manufactured by forming molten glass into a suitable sheet configuration and cooling the glass. The thickness and flatness of these glass sheets can vary due to, among other things, fluctuations in the operating parameters of the various forming processes. Over the years, the demand has increased for glass sheets having more uniform thickness and flatness properties. This is particularly true with respect to glass sheets used in liquid crystal display (LCD) applications. Such glass sheets are typically about 300–500 mm wide, about 400–500 mm long, and 0.7–1.1 mm thick, and have thickness requirements of ±30 microns per sheet and flatness requirements of less than 250 microns across the entire sheet.

Traditionally, glass sheets for flat panel displays were prepared by cutting, beveling the edges, washing, inspecting, annealing and then packing the glass sheets. The sheets were annealed by stacking the sheets on top of one another horizontally, each sheet separated by carbon paper spacers. The entire stack was then annealed at one time. This process did a good job of annealing, but also created scratches on the surface of the glass sheets. Unfortunately, the glass sheets used in LCD applications must be as pristine as possible, meaning they should be scratch free and have low surface roughness. Consequently, horizontally annealed sheets had to be polished to remove these scratches before packing.

To alleviate the need for polishing, attempts were made to anneal the glass in a vertical position, with the sheet either supported on its bottom edge or hung from tongs. These vertical annealing processes sometimes result in a slight decrease in the flatness of the glass sheet. In many cases, if inspected prior to annealing, glass sheets that would go out of specification from such annealing processes could be removed from the process and discarded. It is therefore desirable to inspect each glass sheet for flatness prior to annealing to avoid unnecessary annealing of sheets that will be out of spec after the annealing process.

In the past, various gauging techniques have been utilized to determine and monitor the thickness and flatness of glass sheets during or after manufacturing. Many of these techniques were either destructive to the glass sheet, or too slow to inspect each sheet in normal production operations.

In one such inspection technique, sheets were placed onto a precision lapped granite table, and the flatness of each sheet determined by inserting feeler gauges around the periphery of the sheet. The feeler gauges determine the deviation from the flat table. Such processes are slow, capable of measuring 500 mm×500 mm sheets at a rate of only about three to four sheets per minute. More importantly, such processes are destructive to the glass sheet, resulting in scratching of the glass sheet surface.

Coordinate measuring machines (CMMs), both the contacting probe and optical types, have also been utilized. CMM's tend to be too slow to enable inspection of every sheet in most production lines. For example, such processes are only capable of measuring 500 mm×500 mm sheets at a rate of about 1 sheet per minute.

There thus continues to be a need for a process for gauging the flatness and thickness of glass, which is preferably nondestructive to the surface of the glass and which preferably allows for the measurement of glass sheets at normal production speeds, without interrupting production operations.

SUMMARY OF THE INVENTION

One aspect of the present invention relates to a method for measuring the flatness and thickness of glass sheets. A glass sheet is transported to an inspection station, where the front and back surfaces of the glass sheet are sensed using a plurality of fiber optic sensors. Each sensor senses the front and back surfaces of the sheet at a different measurement location on the sheet, and produces a signal which corresponds to the location of the front and back surface at each measurement location. The signals are sent to a central processing unit where they are used to calculate properties of the glass sheet, such as thickness and flatness. This method is particularly suited to measuring the thickness and flatness of glass sheets for flat panel displays.

Preferably, the glass is transported on rollers which only contact the outermost edges of the sheet. A reference support plane is preferably provided in the inspection station area for accurately supporting the glass sheet during the surface sensing process. For example, the reference plane can be in the form of a plate-like support structure having a plurality of protrusions extending therefrom, the ends of the protrusions forming a flat reference support plane on which to rest the glass sheet. By supporting each glass sheet to be measured on the support plane, and locating the support plane at the same location for each sheet, the support plane acts as a reference plane. In addition, by consistently supporting each glass sheet at the same location, each sheet can be measured in substantially the same manner and location.

Another aspect of the present invention relates to an apparatus for measuring the thickness and flatness of glass sheets. The apparatus includes a sensor support structure which supports a plurality of sensors. A support platen is preferably provided for supporting a sheet of glass in parallel spaced relation to the sensors. One of the sensor support structure or the support platen are movable towards the other. The sensors interact with the glass sheet and send a signal which can be used to determine the location of the surface of the glass sheet. A computer is provided for receiving the signals from the sensors and calculating properties.

Another aspect of the present invention relates to a method for processing glass sheets for use in flat panel displays. A series of glass sheets are transported on rollers to an inspection location, where the front and back surfaces of each of the glass sheets are sensed using a plurality of fiber optic sensors. Each sensor senses the surfaces at a different location on each sheet, and produces at least one signal corresponding to each location. The signals are sent to a central processing unit, where they are used to calculate a flatness value for each glass sheet. The flatness value for each glass sheet is compared to a process specification to determine which glass sheets have a flatness value within the specification, and which glass sheets have a flatness value outside of the specification. Those having a flatness value outside the specification are rejected.

The glass sheets are conveyed to the sensors on a suitable conveyor means. While conventional rollers may be used, more preferably, the process employs edge rollers which only contact the outer periphery of the sheet. The edge rollers have an upraised outer flange thereon to prevent the glass from falling off the rollers. Preferably, the edge rollers are conically shaped.

A preferred sensor for use in the present invention is a fiber optic lever displacement sensor. When moved toward or away from a sheet of glass, such sensors emit a signal which is sent to a computer. The computer utilizes programs to determine, from the signal, the location of each of the major surfaces of a glass sheet, and calculate thickness and/or flatness of the glass sheet.

The method and apparatus encompassed by the present invention have numerous advantages over the prior art. For example, the inspection systems of the present invention can be operated quickly enough to be implemented directly into many of the conventional processing operations which are used to process flat glass sheets. In particular, the inspection systems of the present invention are quick enough to enable inspection of every sheet in conventional LCD glass sheet processing operations. For example, the inspection systems of the present invention are easily capable of measuring 500 mm×500 mm sheets at a rate of about twelve sheets per minute. Therefore, instead of being able to inspect only a few sheets every so often, every sheet in the process can be inspected. If a vertical annealing process is employed, this process can be used, prior to annealing, to remove glass sheets whose flatness will go out of specification as a result of the annealing process.

The inspection systems of the present invention minimize contact with the usable glass surface. The fiber optic sensors themselves do not contact the glass surface, and by utilizing edge rollers, the rollers contact the glass only on it's outer most edges. Consequently, they are especially useful for inspecting glass sheets for use in the manufacture of liquid crystal display systems.

The present invention may be employed directly into one of the conventional manufacturing processes for making glass sheets, or alternatively, as a separate process. For example, the glass can be manufactured and cut into sheets in one facility, and shipped to another facility, such as a customer's facility, where the inspection can then be carried out.

DETAILED DESCRIPTION OF THE INVENTION

Figure 1:
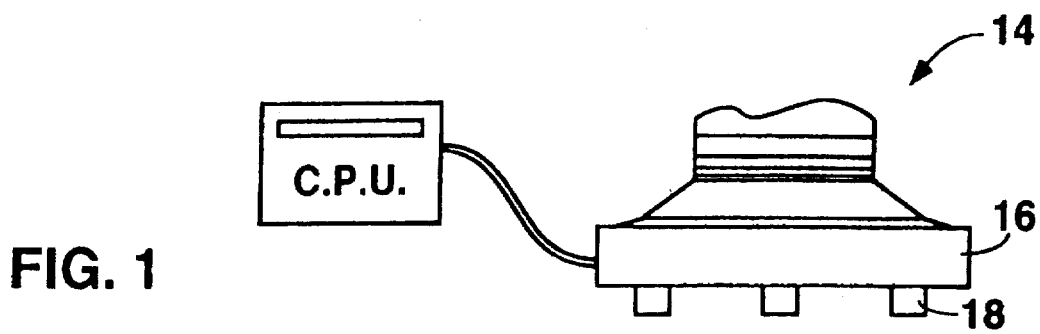
FIGS. 1 and 2 are partial schematic side views illustrating the operation of an inspection system in accordance with the present invention.

As illustrated in FIG. 1, a glass sheet 10 is transported on rollers 12 of conveyor system 11 to inspection station 14. Inspection system 14 includes glass sensors 18 which are supported by support frame 16. Glass sensors 18 are used to sense the location of the upper and lower surfaces of glass sheet 10 at various locations on the sheet. In the embodiment illustrated in FIG. 1, the glass sheet is oriented horizontally, and the sensors 18 sense the vertical (z-axis) location of the upper and lower surfaces.

Figure 1A:
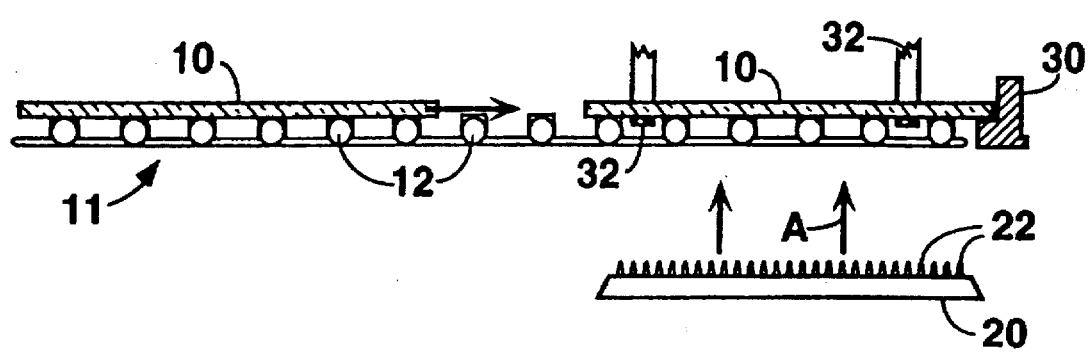
FIG. 1A illustrates an edge roller for use in the present invention.
Figure 2:
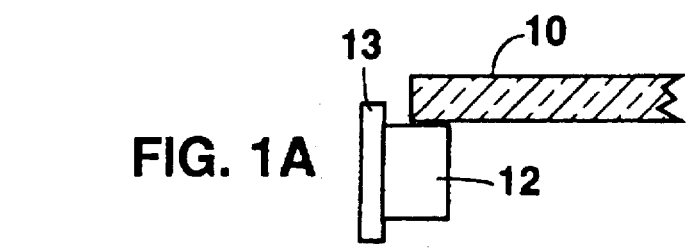

In order to minimize contact with the glass sheet, as illustrated in FIG. 1A, the rollers 12 of the present invention are preferably edge rollers which contact the glass sheet only on its outer periphery. The outer edge of the rollers are provided with an upraised outer flange 13, much like the wheel of a railroad car, to prevent the glass from slipping off the edge of rollers 12. In most flat panel display applications, the quality of the outermost edges of the glass sheets is less critical then the remainder of the glass sheet. For example, in most LCD applications, the outermost 5 mm of the glass sheet has a relaxed surface tolerance, which permits the sheets to be cut to size and the edges and corners of the sheet to be beveled. The glass can therefore withstand more surface contact in these areas. In one embodiment for inspecting glass for liquid crystal display applications, the edge rollers 12 contact the glass sheet only in the outermost 5 millimeter non-quality region.

Figure 3:
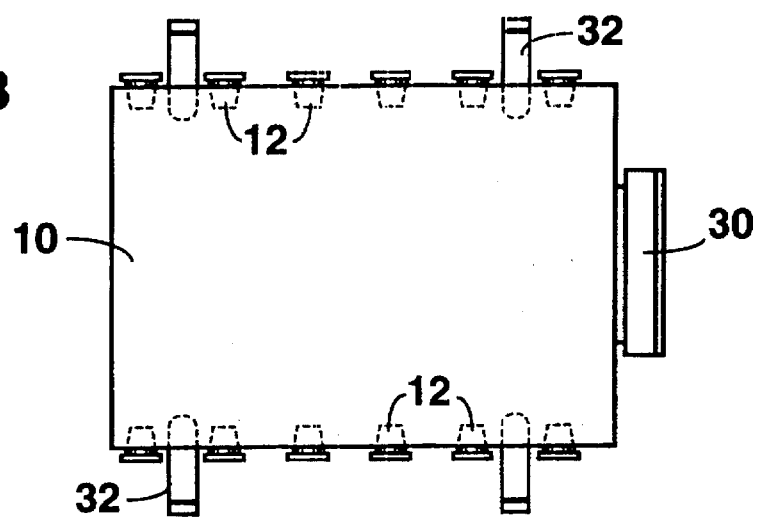
FIGS. 3 and 4 are partial top schematic views of the system illustrated in FIGS. 1 and 2.
Figure 4:
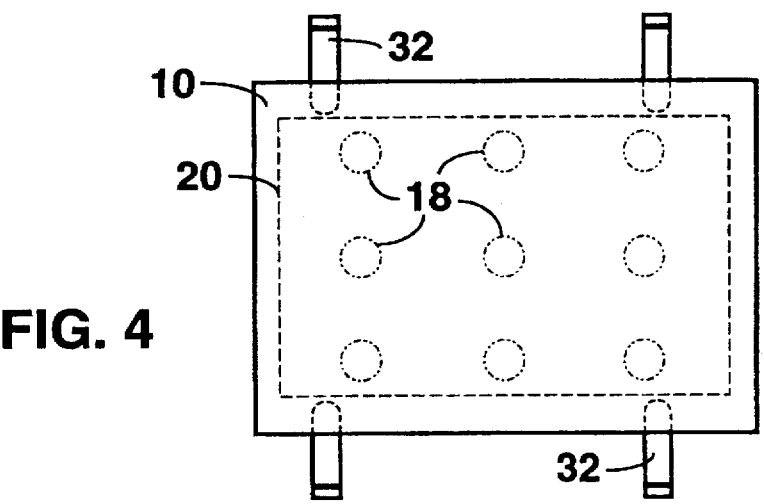

In the most preferred embodiment, the glass contacting surfaces of the edge rollers 12 are tapered conically, as illustrated in FIG. 3. By tapering the rollers 12 in this manner, only the very outer edge (i.e., the lower edge corner) of each glass sheet is contacted.

Once the glass sheet 10 has been transported on edge rollers 12 to inspection station 14, a stop 30 is raised in the path of the glass sheet to stop and accurately locate the sheet for measurement operations. Of course, other methods could be used to accurately locate the glass sheet, such as utilizing a glass sensor (not shown) which senses the presence of the glass sheet and stops the rollers 12 at the appropriate time.

Once the glass sheet is stopped, if the sheet is sufficiently thick and rigid enough not to sag appreciably, the glass sheet can be inspected by lowering the sensors 18 to sense the location of the glass sheet. However, glass sheets ordinarily sag substantially between the edge rollers, making it difficult to measure flatness.

Consequently, in a preferred embodiment of the present invention, the sheet is supported on a suitable support platen 20 to accurately and consistently support each glass sheet. As illustrated in FIG. 1, support platen 20 is provided with a plurality of support tips 22, the distal ends of which form a plane.

The outer periphery of platen 20 is narrower than the opening between the two sets of edge rollers 12 to enable platen 20 to be raised between the edge rollers 12. Once the glass sheet is stopped, it is raised on support platen 20 to a reference plane location. Support platen 20 may be so raised and located, for example, by a screw drive mechanism (not shown) attached to the bottom surface of support platen 20, using conventional machine control techniques to control the screw drive to drive support platen to the reference plane location. By accurately and consistently locating support platen 20 in space with respect to the sensors 18, the plane formed by the support tips 22 can be used as a reference plane against which to measure the flatness of the glass sheet.

The support tips 20 are preferably covered with a soft material to prevent scratching. In a preferred embodiment, the support tips 20 are made of aluminum, and have a protective coating thereon to prevent scratching of the glass surface. One preferred coating is polytetrafluoroethylene. In one preferred embodiment, polytetrafluoroethylene coated, pyramid shaped aluminum support tips 20 are employed which have a 3–4 mm base and an approximately 2 mm height.

Alternatively, rather than stopping the rollers 12, they can continue to rotate, and a set of four lifting fingers 32 can be employed to contact and lift the sheet 10 off of rollers 12, as illustrated in FIG. 1. The four lifting fingers 32 preferably contact only the outermost edges of the glass sheet, minimizing contact with the surface of glass sheet 10. In a preferred embodiment, lifting fingers 32 contact only the outermost 5 mm peripheral region of the glass sheet.

The preferred embodiment of the invention utilizes a digital computer operatively connected to the inspection system. Through this approach, several advantages are realized. For example, the computer inherently provides the means for effecting the various arithmetic computations as well as a memory system for storing various measurements and the signals used to calculate them. The computer also provides a means for controlling movement of the various moving parts of the inspection system. For example, in one embodiment, support platen 20 and sensor support frame 16 are raised and lowered using screw drive or other conventional drive mechanisms (not shown) attached thereto. The operation of these drive mechanisms is controlled by the computer, using conventional machine control techniques, to raise and lower support platen 20 and sensor support frame 16 appropriately to achieve the desired inspection operation, as will be described below.

The type of sensor used is not critical, as long as the sensor is capable of detecting at least one surface of the glass sheet. Preferably, the sensor should be able to accomplish this without contacting the glass sheet.

One preferred sensor is a fiber optic displacement sensor. Such sensors commonly utilize fiber optic bundles in combination with a light source and a photo detector, or other suitable light receiver. The fiber optic bundle in such sensors is typically divided at one end into separate arms, one arm containing transmitting fibers and the other arm containing receiving fibers. The other or common end consists of a common bundle of transmitting and receiving fibers. When the face of the common end of the fiber optic bundle is placed in close proximity to a target, light from the transmitting fibers impinges on the target and is reflected back to the receiving fibers where it is conducted to a photo sensor or other light receiver. The amount of reflected light is proportional to the distance between the end face of the fibers in the common bundle and the surface of the target, the diameter of the fibers, the numerical aperture of the fibers, the geometric distribution of the transmitting and receiving fibers, the total number of fibers, and the reflectivity of the target surface.

A preferred fiber optic sensor for use in accordance with the present invention is a fiber optic lever displacement sensor. One such fiber optic lever displacement sensor is the Fotonic Sensor, manufactured by Mechanical Technology, Inc. of Latham, N.Y., U.S.A. Preferably, a lens system is utilized, with the lever displacement sensor, to focus the transmitted light a desired distance from the sensor. One such lens system, which is operable with the Fotonic Sensor described above, is the KD-LS-1A Optical Extender accessory, which is also manufactured by Mechanical Technology, Inc.

Using a fiber optic lever displacement sensor with a focusing lens system, the transmitting filaments transmit the focused light toward the glass surface. The receiving filaments receive the light reflected from the glass surface, and generate an electrical output voltage signal corresponding to the amount of light received from the receiving filaments. The amount of light varies, depending on the distance from the glass surfaces. The output voltage signal is then used to determine the position of the glass surfaces at the sensor location.

With such focused fiber optic lever displacement systems, when the distance from the front of the focusing system to the reflecting target is approximately the same as the focal length, an image of the probe face will appear on the surface of the reflective target. This image is then transmitted directly back through the focusing system and reimaged onto the probe face. Therefore, a portion of the returning (reflected) light enters the fibers it originated from, rather than the receiving fibers. Because the receiving fibers receive less light, the corresponding output voltage signal is smaller when the sensors are at these locations.

The preferred glass sensing operation is best illustrated with reference to FIGS. 5A through 5D and FIG. 6. FIGS. 5A through 5D illustrate a sensing operation in accordance with the present invention, in which fiber optic lever displacement sensor 18, whose transmitted light is focused using a focusing lens system, is moved to four sequential positions at the same location on a sheet of glass. Phantom line 33 indicates the focal length of the focused transmitted light.

An x, y, and z axis is assigned on the inspection system for directional control by the computer. Support platen 20 is raised to lift a glass sheet 10 off of edge rolls 12. Support platen 20 continues to raise until the plane formed by support tips 22 is located at the reference plane z-axis location. This z axis location is either stored or entered into the computer as the reference location. Sensor support 16 is moved downwardly along the z axis into sensing position to sense the upper and lower surfaces of the glass sheet, as illustrated in FIGS. 5A through 5D.

The output signal from each sensor is sent to the computer. Using equations stored in the computer, the computer calculates flatness and, if desired, thickness information for the glass sheet. The computer preferably has a display monitor for displaying thickness and flatness information. Such information may be displayed in any desired form, such as a profile across the glass sheet, or a series of flatness and thickness data for each location inspected on the glass sheet.

Figure 6:
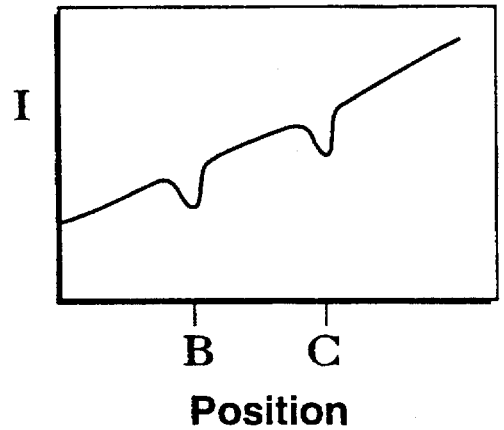
FIG. 6 is a graph of signal intensity vs. position of the output of the sensor illustrated in FIG. 5.
Figure 5A:
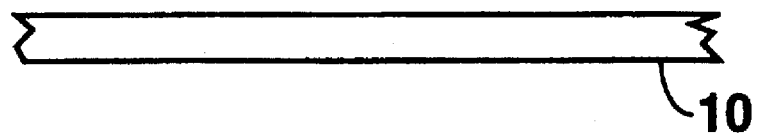
FIGS. 5A, 5B, 5C, and 5D are enlarged partial schematic side view illustrating the operation of a sensor in accordance with the present invention.
Figure 5B:
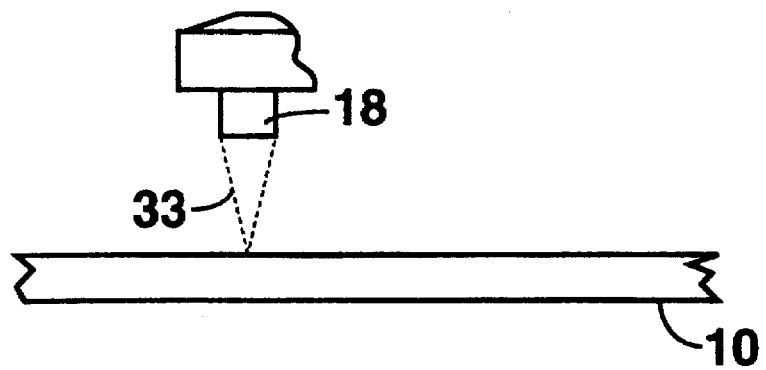
Figure 5C:
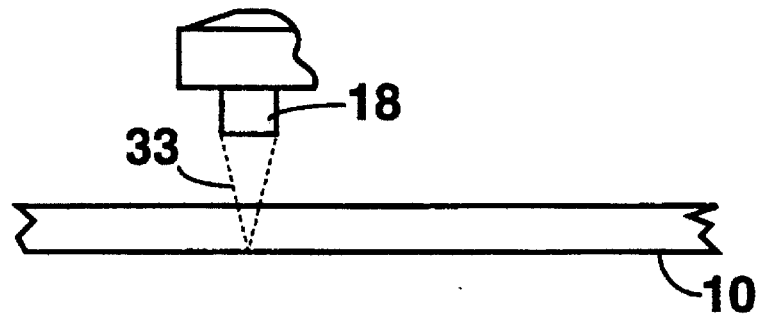
Figure 5D:
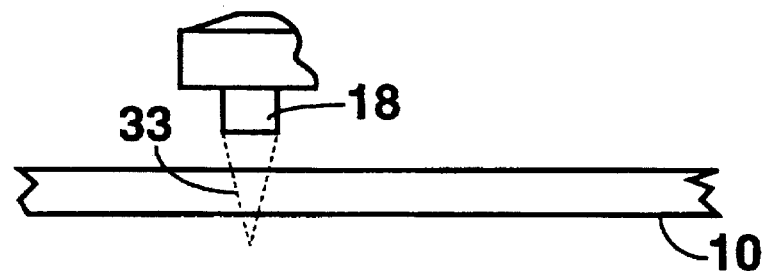

FIG. 6 illustrates a typical intensity curve (Electrical Signal Intensity vs. Probe Position) which occurs as a result of the movement of the sensor illustrated in FIGS. 5A through 5D. The vertical axis in FIG. 6 corresponds to the Intensity of the signal, while the horizontal axis corresponds to the vertical (z-axis) position of the sensor. When the focal length equals the distance from the sensor to either surface of the sheet (FIGS. 5B and 5C), a portion of the transmitted light is reflected back into the light transmitting fibers, rather than the receiving fibers. This produces a dip, or null point, on the intensity curve (points B and C in FIG. 6) of the output signal. These null points correspond to the z-axis location of the sensor when the glass surface is sensed. From these null points, the computer determines the z-axis location of the glass surfaces by subtracting the focal length. By knowing the z-axis locations of the surfaces of the glass sheet and the reference plane formed by support tips 22, the sheets can be inspected for flatness and thickness.

How one chooses to use the conventional analytical techniques, computer programs, and geometric relationships needed to determine the flatness and thickness from these signals is largely a matter of design choice.

In one preferred embodiment, distance values are calculated directly by the computer from the output signals. This may be done, for example, by correlating the horizontal axis of the Signal intensity vs. Probe Position curve (FIG. 6) to agree with actual distances displaced by the sensors 18. Of course, the distances traveled by the sensors and locations of the surfaces of the glass sheet could alternatively be monitored and measured by attaching displacement measuring sensors (not shown) to the sensor support frame 16 to measure the distance traveled and send a corresponding signal to the computer.

To determine thickness of the sheet at any sensor location, the computer determines the distance between the z-axis locations of the top and bottom surfaces of the glass sheet. This distance equals the thickness of the glass sheet at that location. An average thickness value for a glass sheet can be obtained, if desired, by adding the thickness values for each location together and dividing the total by the number of sensor locations. In another embodiment of the invention for measuring thickness, the movement of the sensors is monitored by a displacement sensor (not shown). The displacement sensor, which is connected to support frame 16, sends a signal to the computer which the computer uses to calculate how far the support frame 16 has moved. As the sensors 18 are lowered, they sense the top and bottom surfaces of glass sheet 10 at each sensor location. When a sensor senses the top surface of glass sheet 10, that sensor sends a signal to the computer telling the computer to begin monitoring the displacement sensor to determine the distance traveled by the support frame 16. The distance is monitored until the bottom surface of the glass sheet is sensed. The distance between the top and bottom surfaces of the glass sheet equals the glass sheet thickness at that sensor location.

By knowing the location of each glass surface, relative to the reference plane, at various locations on the glass sheet, the glass sheet can be inspected for flatness. In a perfectly flat sheet of glass, each of the sensors should indicate that the bottom surface of the sheet is at the same z-axis location as the reference plane formed by the support tips 22. Consequently, any deviation from this z-axis location indicates a degree of non-flatness in the sheet. Using these assumptions, it is a simple matter to inspect a sheet for flatness.

For example, in one simple flatness inspection technique, the distance from the lower glass surface to the reference plane is determined for each sensing location on the glass sheet. The computer compares each of these distances with a desired quality control specification value for flatness. If the distance, at any sensor location, is greater than the quality control value, the sheet is rejected for being out of specification for flatness. Thus, if the quality control value is plus 1 mm, and one of the sensors indicates a distance of, for example, 2 mm from the bottom surface of the sheet to the z-axis location of the reference plane, the sheet is rejected.

Although the invention has been described in detail for the purpose of illustration, it is understood that such detail is solely for that purpose and variations can be made therein by those skilled in the art without departing from the spirit and the scope of the invention, which is defined by the following claims.

For example, in the embodiment illustrated, the sensors 18 are lowered to locate the upper and lower surfaces of the glass sheet. Alternatively, of course, the sensor could be located at a reference location (the location of which is stored in the computer), and the glass sheets raised appropriately to sense the location of sheet 10.

What is claimed is:

1. A method for measuring the flatness and thickness of glass sheets, comprising:

transporting a glass sheet along a transport path to an inspection location which comprises a plurality of edge rollers and a glass sheet support beneath the path;

raising said support between said edge rollers to contact and raise said glass sheet above said path;

sensing at least one surface of the glass sheet with a plurality of fiber optic sensors while said sheet is supported above said path, said sensors located at a plurality of locations on said sheet, each sensor sensing said surfaces at each sensor location and producing at least one signal corresponding to the location of one of said surfaces at each location;

sending said at least one signal to a central processing unit; and using said signal to calculate a property of the glass sheet.

2. The method of claim 1, wherein said property is selected from the group consisting of thickness and flatness of said sheet.

3. The method of claim 1, wherein each of said sensors sense both the front and back surface of said sheet, and each sensor produces two signals corresponding to the front and back surfaces at each sensor location.

4. The method of claim 3, further comprising, prior to said sensing step, supporting said glass sheet on a reference plane.

5. The method of claim 4, wherein said reference plane is provided by a plurality of support tips extending from a support platen, the distal ends of said support tips forming a plane.

6. The method of claim 1, wherein said edge rollers are conically shaped.

7. The method of claim 5, wherein said transporting comprises transporting the sheet on a plurality of edge rollers.

8. The method of claim 7, further comprising, prior to said sensing step, raising said platen to support the glass sheet on said support tips.

9. The method of claim 1, further comprising:

lowering said support and thereby lowering said glass sheet back into said transport path; and transporting said glass sheet from said inspection station.

10. A method for processing glass sheets to be used in flat panel displays, comprising:

transporting a series of glass sheets on rollers along a transport path to an inspection location, said inspection station comprising a plurality of edge rollers and a glass sheet support beneath the path;

raising said support between said edge rollers to contact and raise said glass sheet, thereby supporting said glass above said path sensing the front and back surfaces of each of the glass sheets with a plurality of fiber optic sensors while said glass is supported above said path, each sensor sensing said surfaces at a different location on each of said sheets, each sensor producing at least one signal corresponding to each location;

sending said signals to a central processing unit;

using said signals to calculate a flatness value for each glass sheet;

comparing said flatness value with a process specification to determine which glass sheets have a flatness value within said specification, and which glass sheets have a flatness value outside said specification; and rejecting, from said process, said glass sheets having a flatness value outside said specification.

11. The method of claim 10, further comprising annealing said glass sheets having a flatness value within said specification.

12. The method of claim 10, wherein said supporting said glass sheet above said path comprises supporting said glass on a reference plane, said reference plane is provided by a plurality of support tips extending from a support platen, the distal ends of said support tips forming said plane.

13. An apparatus for measuring the thickness and flatness of glass sheets, comprising:

a plurality of sensors for interacting with a glass sheet and producing a signal which can be used to determine the location of at least one surface of the glass sheet;

a sensor support structure supporting said sensors;

a support platen for supporting said glass sheet in parallel spaced relation to the sensors;

a computer for receiving the signals from the sensors and calculating properties;

a conveyor system for transporting said glass sheet to said sensors, said transport system comprising a plurality of edge rollers; and one of said sensor support structure or said support platen is movable towards the other.

14. The apparatus of claim 13, wherein said edge rollers are conical edge rollers.

15. A method for measuring the flatness and thickness of glass sheets, comprising:

transporting a glass sheet to an inspection location;

supporting said glass sheet on a reference plane, said reference plane is provided by a plurality of support tips extending from a support platen, the distal ends of said support tips forming said plane;

sensing at least one surface of the glass sheet with a plurality of fiber optic sensors, said sensors located at a plurality of locations on said sheet, each sensor sensing said surfaces at each sensor location and producing at least one signal corresponding to the location of one of said surfaces at each location;

sending said at least on signal to a central processing unit; and using said signal to calculate a property of the glass sheet.

* * * * *